Feb. 23, 1954  S. G. BROADWAY  2,669,843
SAFETY DEVICE FOR HYDRAULIC BRAKES
Filed Sept. 22, 1952  2 Sheets-Sheet 1

Samuel G. Broadway
INVENTOR.

BY *Clarence A. O'Brien*
and *Harvey B. Jackson*
Attorneys

Feb. 23, 1954

S. G. BROADWAY 2,669,843

SAFETY DEVICE FOR HYDRAULIC BRAKES

Filed Sept. 22, 1952

Samuel G. Broadway
INVENTOR.

BY *Clarence A. O'Brien
and Harvey B. Jackson*
Attorneys

Patented Feb. 23, 1954

2,669,843

UNITED STATES PATENT OFFICE 2,669,843

SAFETY DEVICE FOR HYDRAULIC BRAKES

Samuel G. Broadway, Columbia, Tenn.

Application September 22, 1952, Serial No. 310,853

2 Claims. (Cl. 60—54.5)

The present invention relates to new and useful improvement in hydraulic brake systems for motor vehicles and more particularly to safety means in the system to prevent failure of all of the pressure lines leading to the wheel cylinders should one of the lines become broken or otherwise develop a leak.

An important object of the invention is to provide a safety cylinder between the master cylinder of a hydraulic brake system and the front and rear wheel cylinders and equipping the safety cylinder with front and rear pressure actuated pistons, each of which transmits hydraulic pressure to one set of wheel cylinders and is sealed from the other set of wheel cylinders, whereby failure of one set will not interfere with the normal functioning of the other set.

Another object is to provide a device of this character of simple and practical construction, which is efficient and reliable in operation, relatively inexpensive to manufacture and otherwise well adapted for the purpose for which the same is intended.

Other objects and advantages reside in the details of construction and operation as more fully hereinafter described and claimed, references being had to the accompanying drawings forming part hereof, wherein like numerals refer to like parts throughout, and in which:

Figure 2:
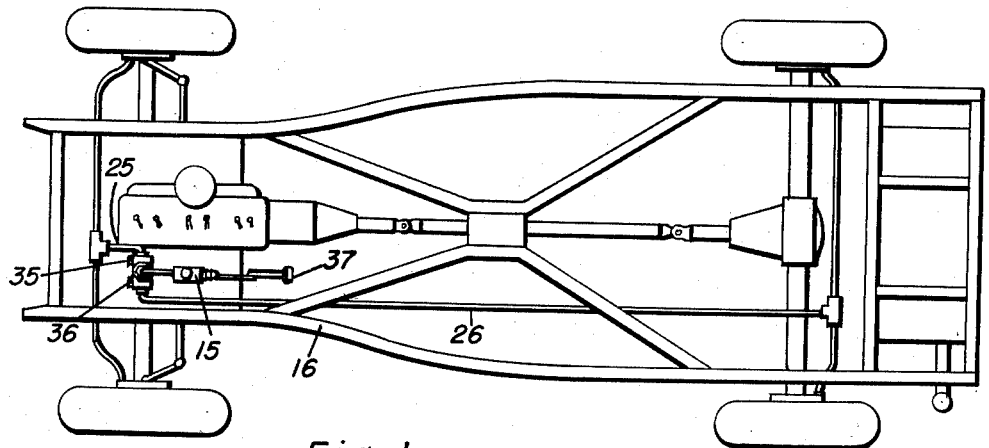
Figure 2 is a plan view showing the safety cylinder installed in the hydraulic brake system.
Figure 1:
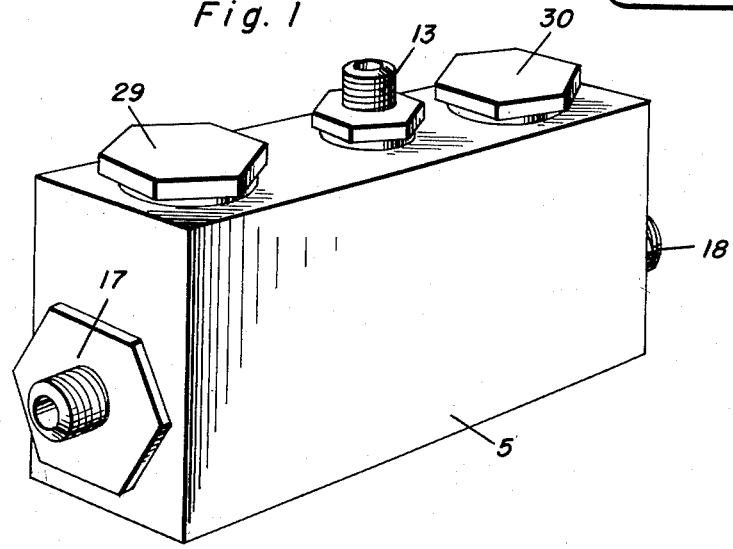
Figure 1 is a perspective view of the safety cylinder.
Figure 5:
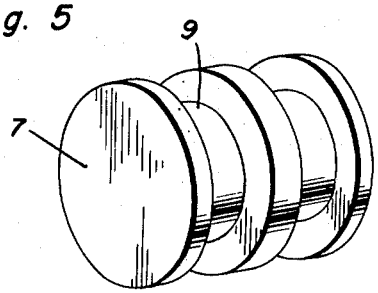
Figure 5 is a perspective view of one of the pistons.
Figure 3:
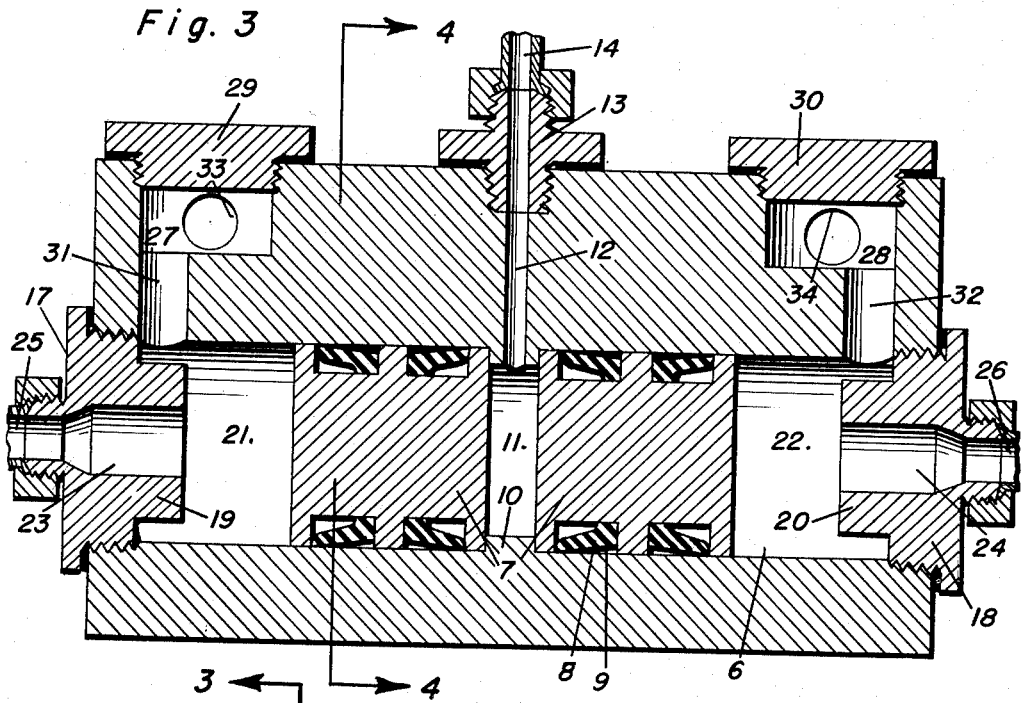
Fig. 3 is an enlarged longitudinal sectional view of the safety cylinder, the section being taken on a line 3—3 of Figure 4.
Figure 4:
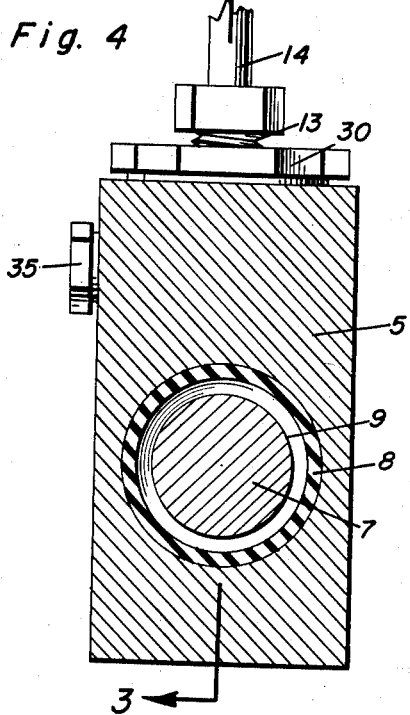
Figure 4 is a transverse sectional view taken on a line 4—4 of Figure 3.
Figure 6:
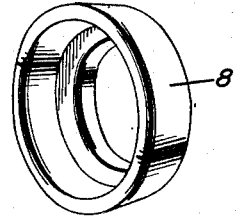
Figure 6 is a perspective view of one of the packing cups or washers for the pistons.

Referring now to the drawings in detail, wherein for the purpose of illustration I have disclosed a preferred embodiment of my invention, the numeral 5 designates a casting having a cylinder 6 extending from end to end thereof.

A pair of pistons 7 are freely slidable in the cylinder and include a pair of packing cups or washers 8 positioned in a pair of circumferential grooves 9 in each piston. An internal annular rib or shoulder 10 is formed in the cylinder at its center to provide a stop for the opposing ends of the pistons to form a chamber 11 therebetween and a passage 12 leads from a threaded nipple 13 at the top of the casting to the chamber 11. A pipe 14 connects nipple 13 to the pressure side of a master cylinder 15 of a hydraulic brake system of a motor vehicle 16.

The ends of the cylinder 6 are closed by threaded plugs 17 and 18 having reduced inner ends 19 and 20 forming stops and chambers 21 and 22 are formed in the ends of the cylinder between the plugs and the pistons. Passages 23 and 24 extend longitudinally of the respective plugs and to which pipes 25 and 26 are respectively connected. Pipe 25 leads to the front wheel cylinders (not shown) of the brake system, which pipe 26 leads to the rear wheel cylinders (not shown).

A pair of filling chambers 27 and 28 are formed in the upper end portions of casting 5 and are closed by threaded plugs 29 and 30 in the top of the casting. A passage 31 connects chamber 27 with chamber 21 and a passage 32 connects chamber 28 with chamber 22 and each of said last named passages enters the respective chambers 21 and 22 in the region of the stops 19 and 20 to prevent closing of said last named passages by the pistons.

Bleed ports 33 and 34 are provided for chambers 27 and 28 and are closed by threaded plugs or cocks 35 and 36.

In the operation of the device, chambers 21, 22, 27 and 28, and the brake lines 25 and 26 connected thereto, are filled with brake fluid and as the brake pedal 37 is depressed the pressure created in the master cylinder 15 is transmitted by way of pipe 14 to the central chamber 11 and subjects pistons 7 to brake applying pressure, one piston applying the front set of brakes and the other piston applying the rear set of brakes.

Should the pipe leading to one of the sets of brake cylinders become broken or develop a leak, the loss of fluid will occur in the chamber at the effected end of cylinder 6 only and the fluid in the chamber and line at the other end of the cylinder 6 will not be effected and thus the unaffected set of brakes will continue to function.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A safety device for hydraulic brake systems of motor vehicles comprising a casting having a cylinder extended therethrough, a plug threaded in each end of the cylinder, each plug having a passage adapted for connecting to one set of wheel cylinders of the brake system, a pair of pistons working in the first named cylinder, an internal annular stop flange at the center of the first named cylinder engaged by and limiting inward movement of the pistons and forming a central chamber between the pistons, a brake applying fluid pressure line leading to said chamber to subject said pistons to brake applying pressure, filler chambers in the top of the casting, passages leading from the filler chambers to the outer portions of the first named cylinder, filler plugs in the top of said filler chambers, bleed plugs in the side of said filler chambers at a point immediately below the filler plugs, and stops limiting outward movement of the pistons to prevent closing of said last named passages by the pistons.

2. A safety device for hydraulic brake systems of motor vehicles comprising a casting having a cylinder extending therethrough, a plug threaded in each end of the cylinder, each plug having a passage adapted for connecting to one set of wheel cylinders of the brake system, a pair of pistons working in the first named cylinder, an internal annular stop flange at the center of the first named cylinder engaged by and limiting inward movement of the pistons and forming a central chamber between the pistons, a brake applying fluid pressure line leading to said chamber to subject said pistons to brake applying pressure, filler chambers in the top of the casting, passages leading from the filler chambers to the outer portions of the first named cylinder, filler plugs in the top of said filler chambers, bleed plugs in the side of said filler chambers at a point immediately below the filler plugs, and stops on the first named plugs projecting in the path of outward movement of the pistons to prevent closing of said last named passages by the pistons.

SAMUEL G. BROADWAY.

References Cited in the file of this patent

UNITED STATES PATENTS

| Number | Name | Date |
|---|---|---|
| 1,952,557 | Masteller | Mar. 27, 1934 |
| 2,077,646 | Snyder | Apr. 20, 1937 |
| 2,539,970 | Pollard et al. | Jan. 30, 1951 |
| 2,556,021 | Young | June 5, 1951 |